US011879368B2

(12) United States Patent
Goldeck et al.

(10) Patent No.: US 11,879,368 B2
(45) Date of Patent: Jan. 23, 2024

(54) METHOD, PROCESSING UNIT, AND COMPUTER PROGRAM FOR ASCERTAINING AN AIR VOLUME PROVIDED BY MEANS OF AN ELECTRIC AIR PUMP IN AN EXHAUST SYSTEM OF AN INTERNAL COMBUSTION ENGINE

(71) Applicant: Robert Bosch GmbH, Stuttgart (DE)

(72) Inventors: Frank Goldeck, Untereisesheim (DE); Angela Leo, Wolfgenbuettel (DE); Henrik Smith, Vienna (AT); Isabell Kathrin Ohrnberger, Bad Wimpfen (DE); Jens Reimer, Besigheim (DE); Rouven Leibbrand, Leingarten (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 17/893,513

(22) Filed: Aug. 23, 2022

(65) Prior Publication Data

US 2023/0061467 A1 Mar. 2, 2023

(30) Foreign Application Priority Data

Aug. 27, 2021 (DE) ..................... 10 2021 209 417.1

(51) Int. Cl.
*F01N 11/00* (2006.01)
*F01N 3/10* (2006.01)
(Continued)

(52) U.S. Cl.
CPC ............ *F01N 11/007* (2013.01); *F01N 3/101* (2013.01); *F01N 1/14* (2013.01); *F01N 3/05* (2013.01);
(Continued)

(58) Field of Classification Search
CPC combination set(s) only.
See application file for complete search history.

(56) References Cited

U.S. PATENT DOCUMENTS

2004/0211170 A1\* 10/2004 Koyama ................ F01N 3/22
60/277
2005/0150209 A1\* 7/2005 Kesch ................... F01N 11/00
60/277

(Continued)

FOREIGN PATENT DOCUMENTS

| DE | 4132814 A1 | 4/1993 |
| DE | 19504208 A1 | 8/1995 |
| DE | 102004006876 A1 | 9/2005 |
| DE | 102016218818 A1 | 3/2018 |
| DE | 102018217569 A1 | 11/2019 |

*Primary Examiner* — Binh Q Tran
(74) *Attorney, Agent, or Firm* — Michael Best & Friedrich LLP

(57) ABSTRACT

A method (200) for ascertaining an air volume provided by means of an electric air pump (134) in an exhaust system (120) of an internal combustion engine (110), including detecting at least one activation parameter (5) of the air pump and ascertaining (220) a provided air mass flow rate (8) on the basis of a calculation specification from the at least one activation parameter (5) by utilizing an inertia of the air pump (134) and/or an inertia of the air upstream and/or downstream from the air pump (134) and/or a differential pressure from upstream from the air pump to downstream from the air pump. In addition, a processing unit and a computer program for carrying out a method (200) of this type is provided.

11 Claims, 3 Drawing Sheets

(51) Int. Cl.
*F01N 3/32* (2006.01)
*F01N 13/08* (2010.01)
*F01N 3/22* (2006.01)
*F01N 3/05* (2006.01)
*F01N 1/14* (2006.01)
*F01N 3/30* (2006.01)

(52) U.S. Cl.
CPC ............... *F01N 3/22* (2013.01); *F01N 3/222* (2013.01); *F01N 3/225* (2013.01); *F01N 3/30* (2013.01); *F01N 3/32* (2013.01); *F01N 3/323* (2013.01); *F01N 3/326* (2013.01); *F01N 13/082* (2013.01); *F01N 2270/02* (2013.01); *F01N 2270/04* (2013.01); *F01N 2270/10* (2013.01); *F01N 2550/14* (2013.01); *F01N 2560/07* (2013.01); *F01N 2610/085* (2013.01)

(56) References Cited

U.S. PATENT DOCUMENTS

| | | | |
|---|---|---|---|
| 2005/0178108 A1* | 8/2005 | Greim | F01N 3/22 60/277 |
| 2005/0241300 A1* | 11/2005 | Nakano | F02D 41/1439 60/285 |
| 2010/0139267 A1* | 6/2010 | Schliesche | F02M 26/15 60/299 |
| 2011/0283685 A1* | 11/2011 | Kotrba | F01N 3/106 60/286 |
| 2012/0000180 A1* | 1/2012 | Gonze | F02D 41/1459 60/297 |
| 2016/0017780 A1* | 1/2016 | Kinugawa | F01N 3/021 60/286 |
| 2019/0345857 A1* | 11/2019 | Rollinger | F01N 3/30 |

* cited by examiner

METHOD, PROCESSING UNIT, AND COMPUTER PROGRAM FOR ASCERTAINING AN AIR VOLUME PROVIDED BY MEANS OF AN ELECTRIC AIR PUMP IN AN EXHAUST SYSTEM OF AN INTERNAL COMBUSTION ENGINE

BACKGROUND OF THE INVENTION

The present invention relates to a method for ascertaining an air volume provided by means of an electric air pump in an exhaust system of an internal combustion engine and to a processing unit and a computer program for the execution thereof.

In order to reach statutory emission limit values, three way catalysts (TWC), which enable a conversion of the relevant gaseous pollutants $NO_x$, HC, and CO into harmless products such as $N_2$, $H_2O$, and $CO_2$, are utilized. In order to ensure that these catalytic reactions take place as intended, the temperatures in the catalytic converter generally must exceed the so-called light-off temperature of typically 300° C. to 400° C. As soon as this has been reached or exceeded, the catalytic converter nearly completely converts the relevant pollutants (the so-called conversion window).

In order to achieve this state as quickly as possible, so-called in-engine catalytic converter heat-up measures are applied. The efficiency of the spark-ignition engine is reduced due to late ignition angles and, thus, the exhaust gas temperature and the enthalpy contribution in the catalytic converter are increased. The combustion stability can be simultaneously ensured by way of adapted injection strategies (for example, multiple injections).

In addition to these in-engine catalytic converter heat-up measures, external catalytic converter heat-up measures can also be utilized, for example, by means of electrically heatable catalytic converters or exhaust gas burners. Such external heat-up measures are described, for example, in DE 41 32 814 A1 and DE 195 04 208 A1.

In order to further reduce emissions in comparison to a conventional operation with in-engine heat-up measures, in particular during cold starts, i.e., high loads on the internal combustion engine in the cold state without an idling phase, so-called catalytic heaters have proven to be an extremely effective measure for accelerating the TWC light-off.

Exhaust gas burners can be supplied with combustion air by utilizing secondary air systems.

SUMMARY OF THE INVENTION

According to the invention, a method for ascertaining an air volume provided by means of an electric air pump in an exhaust system of an internal combustion engine, and a processing unit and a computer program for the execution thereof, having the features of the independent patent claims, are provided. Advantageous embodiments are the subject matter of the subclaims and of the subsequent description.

A method according to the invention for ascertaining an air volume provided by means of an electric air pump in an exhaust system of an internal combustion engine includes detecting at least one activation parameter of the air pump and ascertaining a provided air mass flow rate on the basis of a calculation specification from the at least one activation parameter by utilizing an inertia of the air pump and/or an inertia of the air upstream and/or downstream from the air pump and/or a differential pressure from upstream from the air pump to downstream from the air pump. As a result, the air volume can be ascertained without a dedicated sensor system, which brings advantages with respect to a necessary installation space and with respect to investment costs. The knowledge of the air volume is useful for a plurality of applications in an exhaust system of an internal combustion engine, for example, for the precise control of the air pump itself or other components supplied with air, for example, exhaust gas burners, catalytic converters, particulate filters, and the like.

The air pump can supply air, in particular, to a secondary air system in the exhaust system of a motor vehicle having the internal combustion engine, i.e., supplying air past the internal combustion engine, in particular for supplying an exhaust gas burner. As a result, components of the exhaust system of the internal combustion engine can be operated essentially independently of an operating state of the internal combustion engine, in particular for heating up the components to a necessary operating temperature.

The at least one activation parameter advantageously includes a duty cycle and/or an amperage and/or a voltage utilized for energizing an electric motor of the air pump. These are particularly relevant parameters, which greatly affect the air volume actually delivered.

In advantageous embodiments, the method includes establishing the at least one activation parameter as a function of a requested air mass flow rate and, in particular, as a function of at least one surroundings parameter, which includes, in particular, an air temperature and/or an air pressure and/or a relative atmospheric humidity and/or an air composition and/or a voltage of a vehicle battery and/or an exhaust gas back pressure. As a result, the delivered air volume can be precisely controlled by way of an open-loop or closed-loop system without the need for a dedicated sensor system.

The ascertainment of the provided air mass flow rate advantageously includes ascertaining an air mass flow rate supplied to a predeterminable component downstream from the air pump. As a result, the air mass flow rate available specifically for the relevant component can be ascertained, and so not only is a global consideration enabled, but rather the control can also be adapted to local requirements and conditions. Such components are, as mentioned above, in particular, an exhaust gas burner, a catalytic converter, or a particulate filter.

Advantageous embodiments of the method include ascertaining at least one operating parameter of an exhaust gas burner supplied with air by the air pump on the basis of the ascertained air mass flow rate, wherein the at least one operating parameter includes, in particular, one or multiple variable(s) from the group made up of a temperature of the exhaust gas burner, a temperature downstream from the exhaust gas burner, an exhaust gas mass flow rate downstream from the exhaust gas burner, a composition of an exhaust gas downstream from the exhaust gas burner, and variables derived therefrom. These parameters are decisively affected by the air volume supplied to the exhaust gas burner, and so a physical model of the exhaust gas burner can utilize the air volume supplied thereto as an input variable in order to draw precise conclusions regarding the aforementioned and, possibly, further operating parameters.

In particular, the method can also include controlling an exhaust gas burner as a function of the ascertained air mass flow rate, wherein the control of the exhaust gas burner includes, in particular, metering fuel into a combustion chamber of the exhaust gas burner and activating and/or deactivating an ignition of the exhaust gas burner. As a result, the operation of the exhaust gas burner can be carried out under consideration of the air mass flow rate that is crucial therefor, which, for example, positively affects operational reliability and emission behavior.

In particular, fuel is metered and/or the ignition is activated only for the case in which the ascertained air mass flow rate exceeds a predeterminable threshold value. In this way, fuel that is unburned due to a lack of air is prevented from being discharged from the exhaust gas burner into the exhaust system of the internal combustion engine.

A processing unit according to the invention, for example a control unit of a motor vehicle, is configured, in particular via programming, to carry out a method according to the present invention.

The implementation of a method according to the invention in the form of a computer program or a computer program product having program code for carrying out all method steps is also advantageous, since this generates particularly low costs, in particular when an executing control unit is also used for further tasks and is therefore present anyway. Finally, a machine-readable memory medium is provided, which has a computer program stored thereon as described above. Suitable memory media and data carriers for providing the computer program are, in particular, magnetic, optical, and electrical memories, such as, for example, hard drives, flash memories, EEPROMs, DVDs, and many others. It is also possible to download a program via computer networks (Internet, intranet, etc.). Such a download can take place in a manner that is hardwired or wireless (for example, via a WLAN network, a 3G, 4G, 5G or 6G connection, etc.).

BRIEF DESCRIPTION OF THE DRAWINGS

Further advantages and embodiments of the invention result from the description and the attached drawings.

The invention is schematically represented in the drawing on the basis of exemplary embodiments and is described in the following with reference to the drawings.

DETAILED DESCRIPTION

Figure 1:
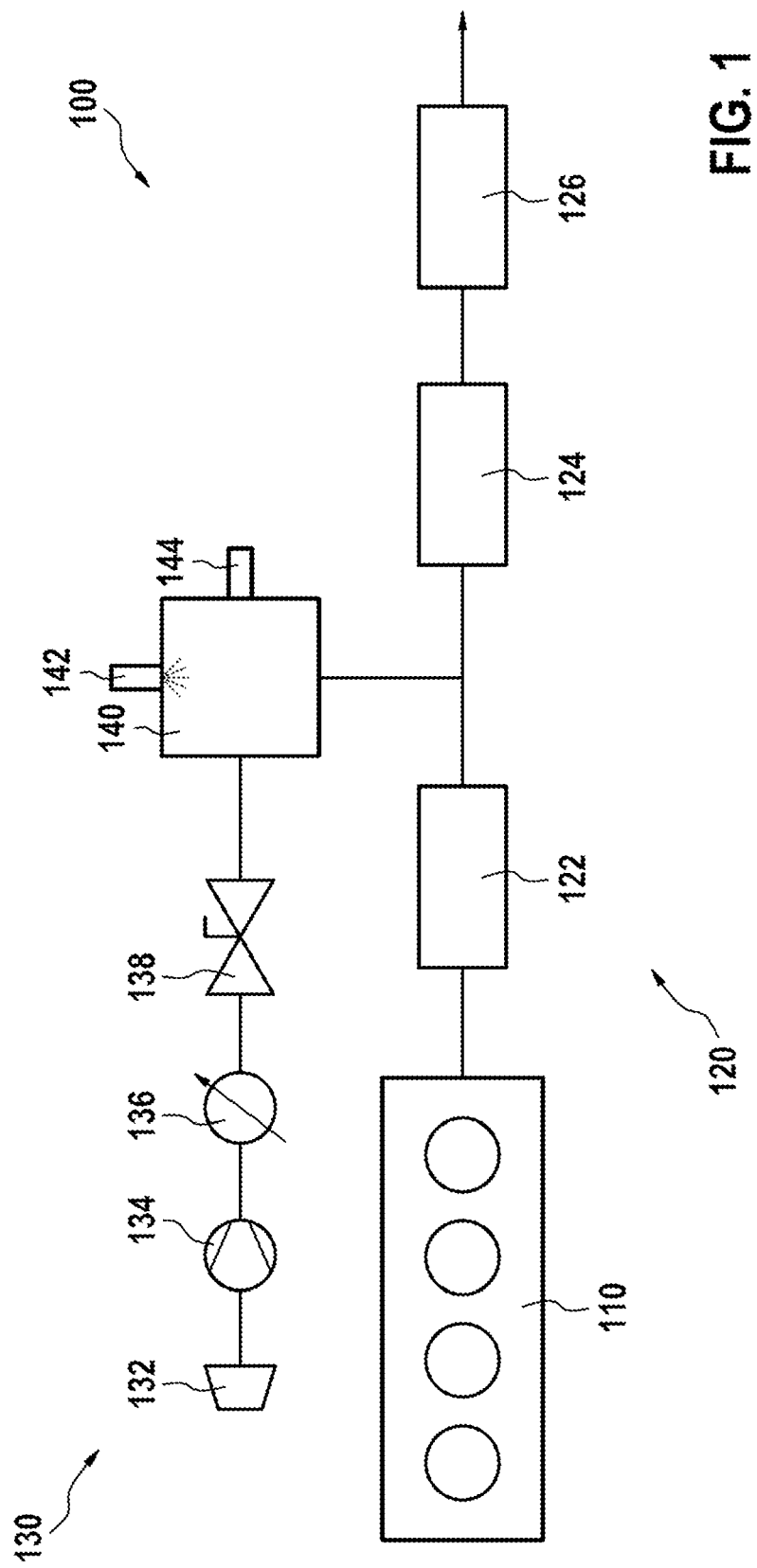
FIG. 1 shows an arrangement of an internal combustion engine having an associated exhaust system, a secondary air system, and an exhaust gas burner of the type which can be utilized within the scope of the invention.

In FIG. 1, an exemplary arrangement of the type which can be utilized within the scope of the invention is schematically represented and designated overall with 100. The arrangement 100 includes an internal combustion engine 110, for example, a reciprocating or rotary piston engine with externally supplied ignition, an exhaust gas system 120, which is configured for the aftertreatment of an exhaust gas generated by the internal combustion engine 110 and which, for this purpose, includes, for example, catalytic converters 122, 124 and a particulate-soot filter 126, an exhaust gas burner 140 for heating up at least a portion of the exhaust system 120, and a secondary air system 130, which is configured for supplying air to the exhaust system 120 and/or to the exhaust gas burner 140 in order to enable and/or promote oxidation reactions.

In the exemplary embodiment represented here, the exhaust gas burner 140 includes a fuel injection system 142 for introducing fuel into the exhaust gas burner 140, and an ignition system 144 for igniting the fuel.

The secondary air system 130 contains, here, an air filter 132, an (electric) air pump 134, a sensor 136, for example, a pressure and/or temperature sensor, and a secondary air valve 138, which can be provided, for example, in the form of a check valve and can prevent or permit a supply of air out of the secondary air system 130 into the exhaust gas burner 140 and into the exhaust system 120.

It is understood that the components of the arrangement 100 described here do not necessarily have to be arranged in the order with respect to one another represented here. For example, the sensor 136 can also be arranged downstream from the valve 138 or the particulate filter 126 can be arranged upstream from the catalytic converter 124. Moreover, it can be advantageous to provide further components or to provide connections between the secondary air system 130 and the exhaust system 120 at other points. Instead of a pressure sensor 136 or in addition thereto, a differential pressure sensor can also be provided over the air pump 134 and/or over the secondary air valve 138.

In the following, method steps and device components are explained in terms of their interaction. Reference characters that refer to device components can also be utilized for describing the method steps carried out therein, and vice versa.

Figure 2:
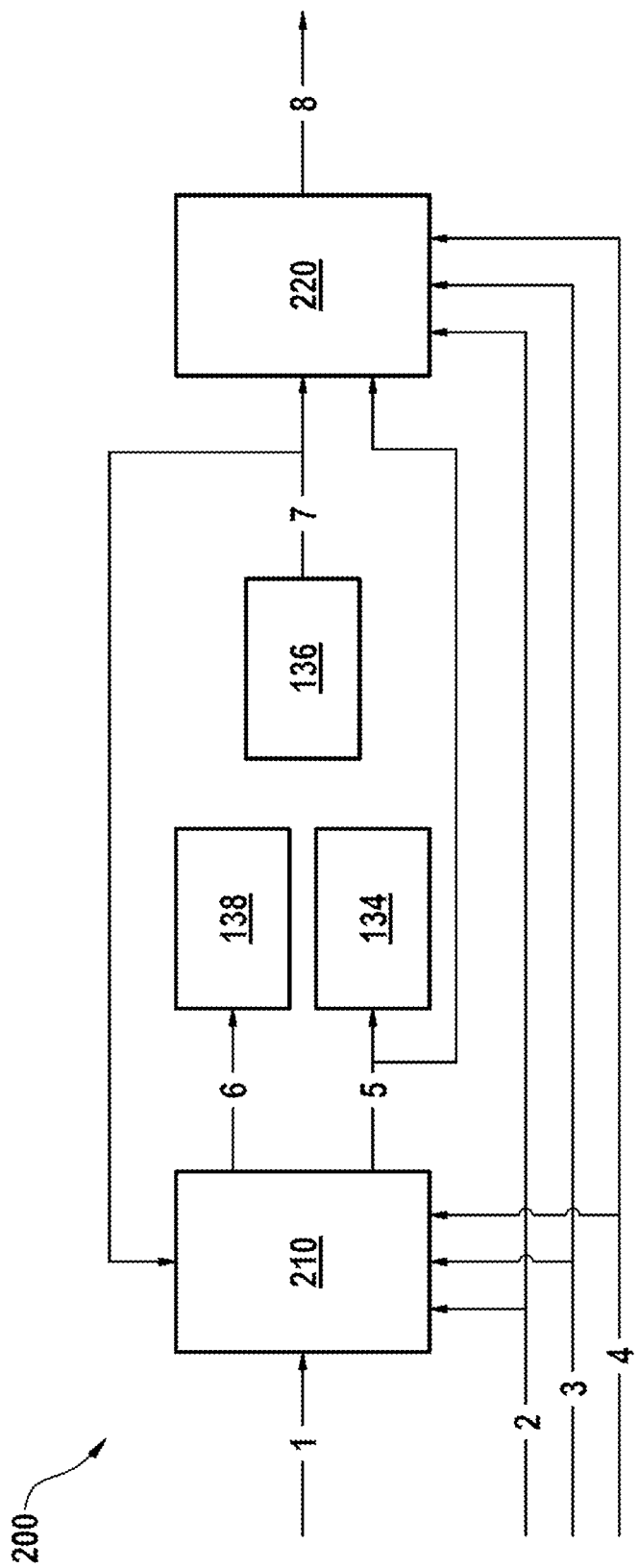
FIG. 2 schematically shows an advantageous embodiment of a method according to the invention in the form of a block diagram.

In FIG. 2, an advantageous embodiment of a method according to the invention is schematically represented in the form of a block diagram and is designated overall with 200.

The method 200 includes a secondary air controller 210, which ascertains, on the basis of an air volume request 1 and further input variables 2, 3, 4, an activation signal 5 for the air pump 134 and a control signal 6 for adjusting the secondary air valve 138 and outputs these to the appropriate components and their controllers. An electric air pump includes an activatable electric motor and an air delivery mechanism, for example, a turbine, which is driven by the electric motor.

The activation signal 5 can include, in particular, a duty cycle for energizing the electric motor of the air pump 134, by means of which an effective pump power of the air pump 134 can be set. The control signal 6 can trigger, in particular, an opening or closing of the secondary air valve 138. Embodiments are also conceivable, however, in which intermediate positions of the secondary air valve 138 can also be set, for example, when the secondary air valve 138 is provided not as a check valve, but rather, for example, in the form of a throttle valve, or the like. In such cases, the control signal 6 brings about an appropriate setting of the secondary air valve 138 in order to allow the desired air mass flow to pass.

The aforementioned further input variables 2, 3, 4 can include, in particular, a current ambient temperature (corresponds to the temperature of the air upstream from the air filter 132 and upstream from the air pump 134), an exhaust gas back pressure, and a current voltage of a vehicle battery, which is utilized for energizing the air pump 134. Further input variables that can exert an influence on the air volume delivered by the air pump 134 can also be taken into account.

These input variables 2, 3, 4 flow, together with the activation signal 5, to an air volume ascertainment 220, which, in the exemplary embodiment represented here, also receives a pressure signal 7 from the sensor 136. The air volume ascertainment 220 determines, on the basis of a calculation specification, the air volume actually delivered by the air pump 134, wherein an inertia of the air pump 134 itself as well as the delivered air are taken into account. In particular, a change in the activation signal results in a changed air volume with a time delay. Moreover, fluid mechanics-related data from components of the secondary air system 130, through which the air flows, can be incorporated into the ascertainment 220. In particular, pipeline cross-sections, surface structures, changes in direction, turbulence-inducing fixtures, and the like are relevant. Inertia can be taken into account in the calculation specification, for example, by means of a suitable delay and/or filtering of the activation signal. A taking into account of this type can be implemented, for example, in the form of a delay time or in the form of a constant delay, for example, by way of a PT1 element, etc.

The air volume ascertainment 220 outputs an air volume signal 8, which contains a piece of information regarding the air mass flow that is provided by the air pump 134 at at least one predeterminable position within the secondary air system 130 or the exhaust system 120. Of course, such calculations can also be carried out for multiple positions, wherein it is advantageous to adapt the calculation specification by means of standalone parameter sets for the particular position. In other words, the calculation specification can be the same, in principle, for some or all positions and differ only with respect, for example, to utilized delays and/or filters.

The air volume signal 8 can be utilized, on the one hand, for controlling components supplied with the secondary air (for example, the exhaust gas burner 140 or a catalytic converter 124 or the particulate filter 126) and, on the other hand, however, for the secondary air controller 210 itself, which can receive the signal in the form of feedback for tuning the activation signal 5 and/or the control signal 6. The pressure signal 7 can also be utilized by the secondary air controller 210 in order to more precisely provide the requested air volume 1.

If the air volume signal 8, as mentioned, is utilized, for example, for controlling the exhaust gas burner 140, it can be provided, for example, that the fuel injection system 142 of the burner is activated or released only for the case in which a minimum air mass flow into the exhaust gas burner 140 has been detected. It can therefore be ensured that unburned fuel is not discharged into the exhaust system 120, or that the ignition system 144 is not wetted, which could be extremely disadvantageous with respect to subsequent ignition safety. If the minimum air mass flow has been detected, for example, the fuel injection system 142 as well as the ignition system 144 can be simultaneously activated when a heating-up of components of the exhaust system 120 arranged downstream from the exhaust gas burner 140 is requested.

In particular, the fuel injection system 142 can then be controlled with respect to a metered amount of fuel in such a way that the amount of fuel and the ascertained air volume (signal 8) yield a predeterminable air-fuel ratio. The ignition system 144 may also be controlled depending on the air mass flow that is flowing in according to the air volume signal 8. For example, at high air mass flow rates, an earlier ignition point in relation to a point of injection can be set than is the case at a low air mass flow rate, in order to take the increased dynamics in the combustion chamber of the exhaust gas burner 140 into account.

The exhaust gas burner 140 can then be actively operated for as long as it takes for a shut-off condition to arise, for example, a setpoint temperature of the component to be heated has been reached or a maximum operating time has been exceeded. One further possibility of a shut-off condition could be a fault in the secondary air system 130, which can be detected via a strong change in the air volume signal 8. For example, if the air volume suddenly decreases in the absence of an appropriate previous intervention on the activation signal 5, a fault can be detected, which can then trigger a targeted (emergency) shut-off of the exhaust gas burner 140.

In some embodiments of an exhaust gas burner control of this type, the further input variables 2, 3, 4 can also be utilized as release and/or abort triggers. For example, it can be provided that the battery voltage is checked before the exhaust gas burner is started in order to ensure that the air pump 134 and the ignition system 144 can be properly activated.

In some embodiments, however, only a request for secondary air can take place also in the absence of an additional heat request to the exhaust gas burner 140, for example, in order to achieve a regeneration of the particulate filter 126 regardless of a current operating point of the internal combustion engine. In a case of this type, secondary air can be introduced into the exhaust system 120, for example, bypassing the exhaust gas burner 140 (not represented in the figure), or it can be provided that the secondary air is introduced into the exhaust system 120 through the exhaust gas burner 140, which saves additional pipelines and, possibly, valves for guiding the air mass. In such cases, the fuel injection system 142 and the ignition system 144 of the exhaust gas burner can remain deactivated, since no additional heat input into the exhaust system is necessary.

The air volume signal 8 can also function as an input variable for an exhaust gas model, which is utilized for ascertaining parameters of the burner exhaust gas and/or of the exhaust gas of the internal combustion engine. On the basis of the air volume actually introduced into the exhaust gas burner 140 and which results from the air volume signal 8, it is possible to determine, for example, a temperature within and/or at a position downstream from the exhaust gas burner 140, an exhaust gas composition downstream from the burner (for example, lambda value, mass flow rate of unused oxygen, mass flow rate of unburned fuel, water content, . . . ), or an overall mass flow rate of the burner exhaust gas with an amount of fuel metered by the fuel injection system 142 on the basis of a physical model of the exhaust gas burner 140. In combination with additional operating parameters of the internal combustion engine 110, such parameters can also be ascertained with respect to a combined exhaust gas from the exhaust gas burner 140 and the internal combustion engine 110, and so the overall exhaust gas system 120 can be controlled more precisely and, thus, in a manner that is further optimized with respect to emissions.

In the ascertainment of temperatures of the burner exhaust gas within and/or downstream from the exhaust gas burner 140, it is possible to take into account not only energy released during the combustion, which can be calculated, in particular, on the basis of the resultant mass flow rates, but also thermal losses due to the heating-up of the exhaust gas burner 140 itself, or components arranged downstream from the exhaust gas burner 140, such as pipelines, catalytic converters 124, or the like. If the exhaust gas burner 140 is inactive, a reference temperature can be utilized as a quasi-stationary temperature, to which the current value is filtered with the aid of a low-pass filter. A sensor 136 positioned upstream or downstream from the exhaust gas burner 140, provided this has been installed, can be utilized as the reference temperature. Alternatively or additionally, a model value from an exhaust gas model of the internal combustion engine 110 can also be utilized, since, when the exhaust gas burner 140 is inactive, the exhaust gas of the internal combustion engine 110 can flow back into the exhaust gas burner 140. An interpolation from these values is also conceivable, as the result of which the inertia of the sensor value can also be taken into account.

The composition of the burner exhaust gas depends, in particular, on the air volume actually delivered into the exhaust gas burner 140, and so, on the basis thereof, in combination with the metered amount of fuel, the lambda value of the burner exhaust gas as well as the mass flow rate of unused oxygen (lean air-fuel mixture in the exhaust gas burner 140) and unburned fuel (rich mixture in the exhaust gas burner 140) result. A water content of the burner exhaust gas can also be calculated on the basis of essentially these two variables, since the main portion of water contained in the exhaust gas arises due to the combustion of the hydrogen-containing fuel. A relative exhaust gas moisture results from the water content in connection with the particular local exhaust gas temperature.

Figure 3:
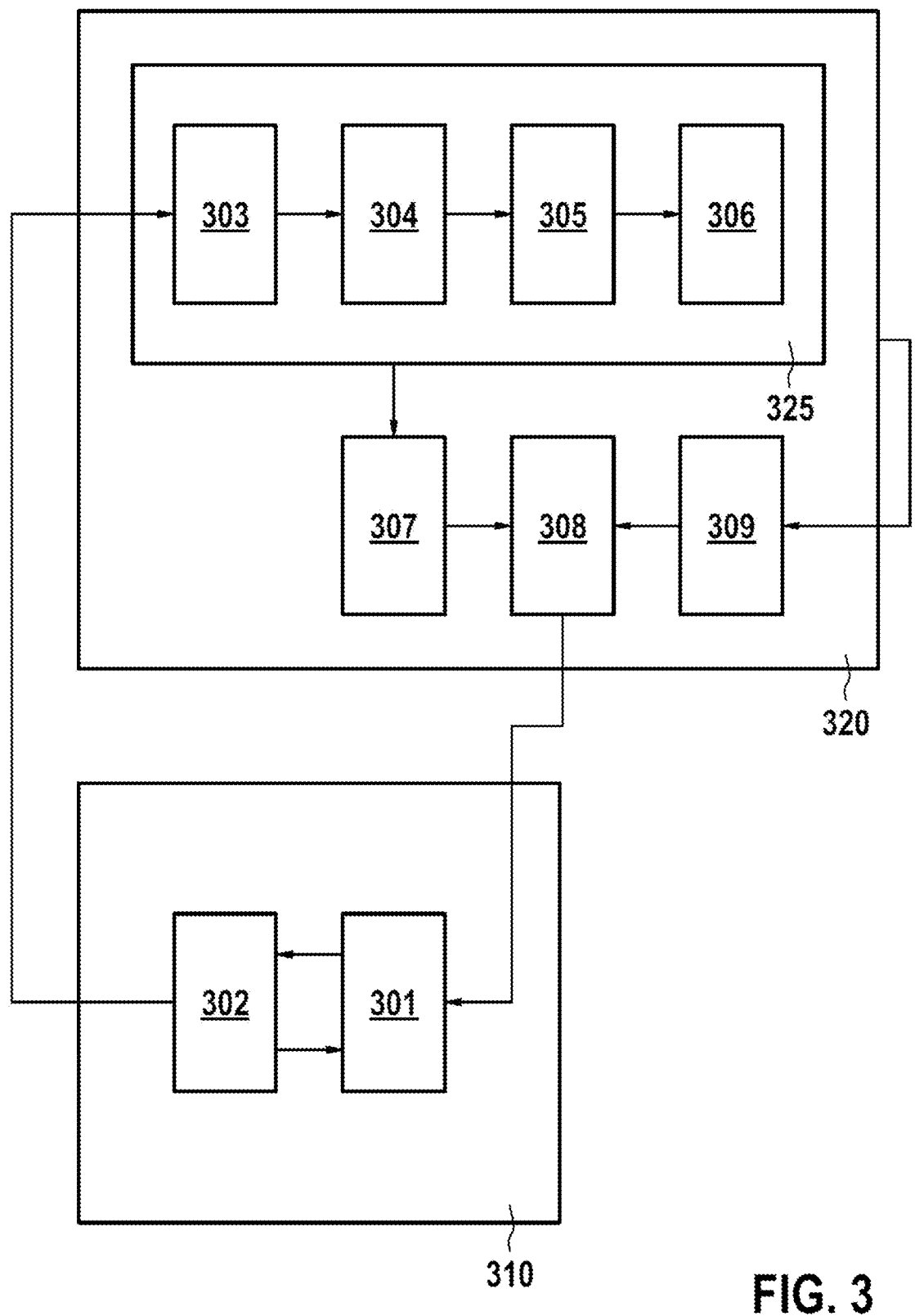
FIG. 3 shows a method for operating an exhaust gas burner, within the scope of which an advantageous embodiment of a method according to the invention can be applied, as a schematic block diagram.

In FIG. 3, a method for operating an exhaust gas burner (for example, the exhaust gas burner 140 from FIG. 1) is schematically represented in the form of a block diagram and is designated overall with 300. An advantageous embodiment of a method according to the invention, for example, the method 200 explained with reference to FIG. 2, can be applied within the scope of the method 300.

The method 300 is subdivided into inactive control states 310 and active control states 320. The inactive control states 310 include a switched-off state ("Off") 301 and a standby state ("Standby") 302, wherein the switched-off state 301 is the basic state of the control of the exhaust gas burner 140. A switch takes place from this state into the standby state 302 when a release condition has been met and an abort condition is not present. The release condition is made up, for example, of a minimally present battery voltage and a maximum catalytic converter temperature (for example, further input variables 2, 3, 4 from FIG. 2) and is retracted when an aborted start has been detected (by observing the state of the internal combustion engine 110) (abort condition).

As long as the conditions for the standby 302 have been met, a request from the burner will be awaited in this state 302. If there is a request, the system switches into a starting state 303 of the active control states 320. The request to heat up the catalytic converter can be coupled, in particular, to the start of the control unit or the internal combustion engine. It is possible to select when the exhaust gas burner actually starts: only when there is a request to heat up the catalytic converter or, additionally, always after a completed start of the internal combustion engine 110 or in the presence of a start command.

In order to prevent a direct restart of the exhaust gas burner 140 after the burner has been operated, the request to operate the exhaust gas burner can be retracted after an operation of the exhaust gas burner 140.

In the starting state 303, the system is prepared for the fuel injection. The secondary air system 130 and the fuel pump of the fuel injection system 142 of the exhaust gas burner 140 are requested. If the system is ready (the secondary air pump 134 is active and the valve 138 is open), a switch into an injection state 304 takes place.

In this injection state 304, the fuel injection 142 and the ignition 144 start. As soon as a successful combustion has been detected, the state changes into a performance increase state 305 ("ramp up"). The combustion detection can be carried out, for example, such that an exhaust gas burner temperature is stored upon entry into the injection state 304 and is constantly compared to the current value upon further calculation in this state. If the temperature difference between these two values increases above an applicable threshold (for example, depending on the start temperature), combustion is detected. One further possible alternative to the combustion detection is to observe an adjustment of a lambda setpoint value, wherein combustion can be detected when a control variance is less than a predeterminable threshold value.

In the performance increase state 305, the burner 140 is ramped up to its nominal output. If this ramp-up has ended (i.e., the nominal output has been reached), a switch into a heat-up state 306 takes place.

The heat-up state 306 is maintained for as long as the exhaust gas burner 140 is requested or another condition arises, which switches off the burner 140.

Another active state is a shut-down state 307 ("shut_down"). This shut-down state 307 can be requested from any of the aforementioned active states 303, 304, 305, 306 (collectively referred to as normal states 325) as soon as there are no more requests, the release conditions are no longer met, or the abort condition has been met. This shut-down state 307 is to ensure that the exhaust gas burner system is properly switched off (setpoint values set to 0, secondary air system 130 switched off, fuel pump request retracted, . . . ). Once a successful shut-down via deactivation of the secondary air pump 134 and closure of the secondary air valve 138 has been detected, the method 300 switches into a conditioning state 308, in which the system and/or downstream functions are prepared for the next execution of the method 300 and variables and classes are reset, if necessary. After this reinitialization, the conditioning state 308 is immediately exited into the Off state 301.

Alternative embodiments of a detection of a successful shut-down include an observation of an actual heat output, wherein a successful shut-down is detected when the heat output falls below a threshold value.

Abort conditions can include, for example, an excessively long period of operation of the exhaust gas burner 140 (threshold applicable), an excessively high temperature of the exhaust gas burner 140 (threshold applicable), or a detected extinguishing of a flame. The detection of a flame having been extinguished can be triggered when a minimum temperature of the exhaust gas burner 140 has been fallen below (applicable threshold), a falling temperature is ascertained (temperature difference is (applicably) negative over multiple calculation steps), or an excessively high lambda control variance (negative and positive threshold; debounced) is triggered. An evaluation of the lambda probe voltage or of an enrichment factor are alternatives to the evaluation of the lambda control variance.

Moreover, a fault state 309 is provided, which can be switched into from any of the active states 320 when a fault is detected in the method 300. This fault state 309, similarly to the shut-down state 307, is also exited only once the shut-down has been detected and then switches into the conditioning state 308.

A fault can be detected, in particular, for the case in which the method 300 remains in one of the active states 320 for longer than a maximum duration, wherein the maximum duration can be established separately for each of the states 303, 304, 305, 306, 307, 308. A maximum duration of this type is advantageous at least for the injection state 304. If a switch from the injection state 304 into the performance increase state 305 does not take place, this indicates that combustion was not detected, and so a fault at the fuel injection system 142 or at the ignition system 144 is likely. In a case of this type, the exhaust gas burner 140 should not continue to be operated, since there is a risk that unburned fuel will flood the combustion chamber of the exhaust gas burner 140 and/or the exhaust system 120. In the other states, a maximum duration is helpful so that, if the particular state has not been successfully exited, it is possible to properly terminate the method 300.

In order to conserve resources, the method 300 can control the calculation of downstream functions. If the burner 140 is not required, the remaining burner functionalities, such as, for example, the lambda control, cannot be calculated. For this purpose, the method distinguishes between active states 310 and inactive states 320.

The invention claimed is:

1. The method (200) for ascertaining an air volume provided by means of an electric air pump (134) in an exhaust system (120) of an internal combustion engine (110), the method comprising:
   detecting at least one activation parameter (5) of the air pump, and
   ascertaining (220), via a computer, a provided air mass flow rate (8) based on a calculation specification from the at least one activation parameter (5) by utilizing at least one selected from the group consisting of an inertia of the air pump (134), an inertia of the air upstream from the air pump (134), an inertia of the air pump (134) downstream from the air pump (134), and a differential pressure from upstream from the air pump to downstream from the air pump.

2. The method (200) according to claim 1, further comprising supplying, via the air pump (134), air to a secondary air system (130) of a motor vehicle having the internal combustion engine (110).

3. The method (200) according to claim 1, wherein the at least one activation parameter (5) includes at least one selected from the group consisting of a duty cycle, an amperage, and a voltage utilized for energizing an electric motor of the air pump (134).

4. The method (200) according to claim 1, further comprising establishing (210) the at least one activation parameter (5) as a function of a requested air mass flow rate (1).

5. The method (200) according to claim 1, wherein the ascertaining (220) the provided air mass flow rate (8) includes ascertaining an air mass flow rate supplied to a predeterminable component (124, 126, 140) downstream from the air pump (134).

6. The method (200) according to claim 1, further comprising ascertaining at least one operating parameter of an exhaust gas burner (140) supplied with air by the air pump (134) based on the ascertained air mass flow rate (8), wherein the at least one operating parameter includes at least one variable selected from the group consisting of a temperature of the exhaust gas burner (140), a temperature downstream from the exhaust gas burner (140), an exhaust gas mass flow rate downstream from the exhaust gas burner (140), a composition of an exhaust gas downstream from the exhaust gas burner (140), and variables derived therefrom.

7. The method (200) according to claim 1, further comprising controlling an exhaust gas burner (140) as a function of the ascertained air mass flow rate (8).

8. The method (200) according to claim 7, wherein controlling the exhaust gas burner (140) includes metering (142) fuel into a combustion chamber of the exhaust gas burner (140) and activating and/or deactivating an ignition (144) of the exhaust gas burner (140).

9. The method (200) according to claim 8, wherein fuel is metered (142) and/or the ignition (144) is activated only for the case in which the ascertained air mass flow rate (8) exceeds a predeterminable threshold value.

10. A computer configured to ascertain an air volume provided by means of an electric air pump (134) in an exhaust system (120) of an internal combustion engine (110), by:
    detecting at least one activation parameter (5) of the air pump, and
    ascertaining (220) a provided air mass flow rate (8) based on a calculation specification from the at least one activation parameter (5) by utilizing an inertia of the air pump (134), an inertia of the air upstream from the air pump (134), an inertia of the air downstream from the air pump (134), and a differential pressure from upstream from the air pump to downstream from the air pump.

11. A non-transitory computer-readable medium containing instructions that when executed by a computer cause the computer to ascertain an air volume provided by means of an electric air pump (134) in an exhaust system (120) of an internal combustion engine (110), by:
    detecting at least one activation parameter (5) of the air pump, and
    ascertaining (220) a provided air mass flow rate (8) based on a calculation specification from the at least one activation parameter (5) by utilizing an inertia of the air pump (134), an inertia of the air upstream from the air pump (134), an inertia of the air pump (134) downstream from the air pump (134), and a differential pressure from upstream from the air pump to downstream from the air pump.

* * * * *